United States Patent

[11] 3,626,840

| [72] | Inventor | William T. Day |
| | | 7315 East 24th St., Tulsa, Okla. 74129 |
| [21] | Appl. No. | 37,128 |
| [22] | Filed | May 14, 1970 |
| [45] | Patented | Dec. 14, 1971 |

[54] FOOD FRYER
3 Claims, 6 Drawing Figs.

[52] U.S. Cl. ................................................ 99/355, 99/403, 99/450
[51] Int. Cl. ................................................ A47j 37/12
[50] Field of Search ........................................ 99/355, 352, 403-404, 405-406, 407-408, 409-410, 411-412, 413-414, 415-416, 417-418; 118/13, 26, 29, 31, 501; 339/60, 116, 191, 211

[56] References Cited

UNITED STATES PATENTS

| 2,177,166 | 10/1939 | Bemis | 99/407 X |
| 3,013,485 | 12/1961 | Leiby | 99/355 |
| 2,731,943 | 1/1956 | Randall | 118/26 X |
| 2,760,175 | 8/1956 | Dunn | 339/60 X |
| 759,618 | 5/1904 | Korbel | 99/410 UX |
| 1,310,663 | 7/1919 | Kepler | 118/501 X |
| 1,731,893 | 10/1929 | Fischer | 339/191 X |
| 3,124,058 | 3/1964 | Elston | 99/407 X |
| 961,474 | 6/1910 | Allsopp | 99/450 UX |
| 2,066,749 | 1/1937 | Trank | 99/418 X |

FOREIGN PATENTS

| 984,525 | 2/1951 | France | 99/417 |

Primary Examiner—Billy J. Wilhite
Assistant Examiner—Arthur O. Henderson
Attorney—Young & Thompson ABSTRACT: A food fryer comprises a table having three recessed receptacles in the top thereof. The first contains a heater for cooking oil to fry food submerged in or floating on the oil, and has a laterally extending sloped drain recessed below the table top, that not only returns draining oil to the first receptacle but also receives what would otherwise be overflow from the first receptacle. A second receptacle receives a removable draining receptacle for cooking racks; while the third receptacle may for example comprise a reservoir for glazing or other liquids and has a sloped drainboard beneath a draining rack.

Patented Dec. 14, 1971
3,626,840
2 Sheets-Sheet 1
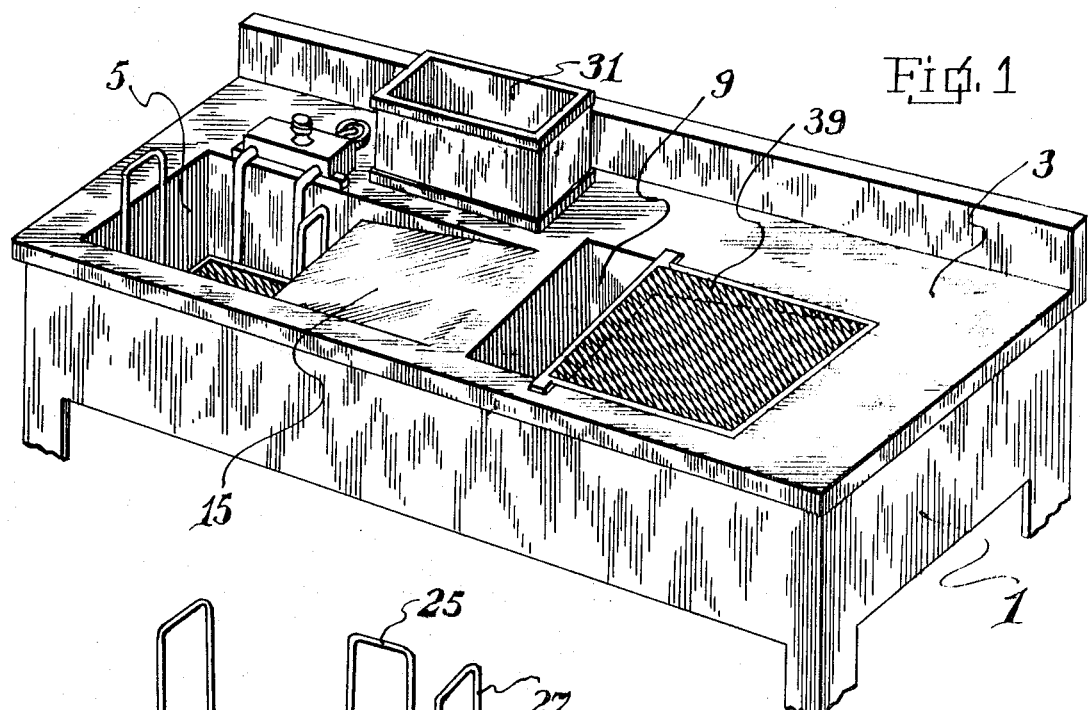
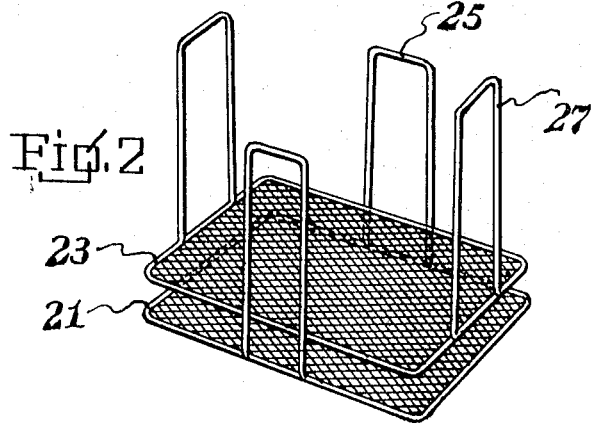
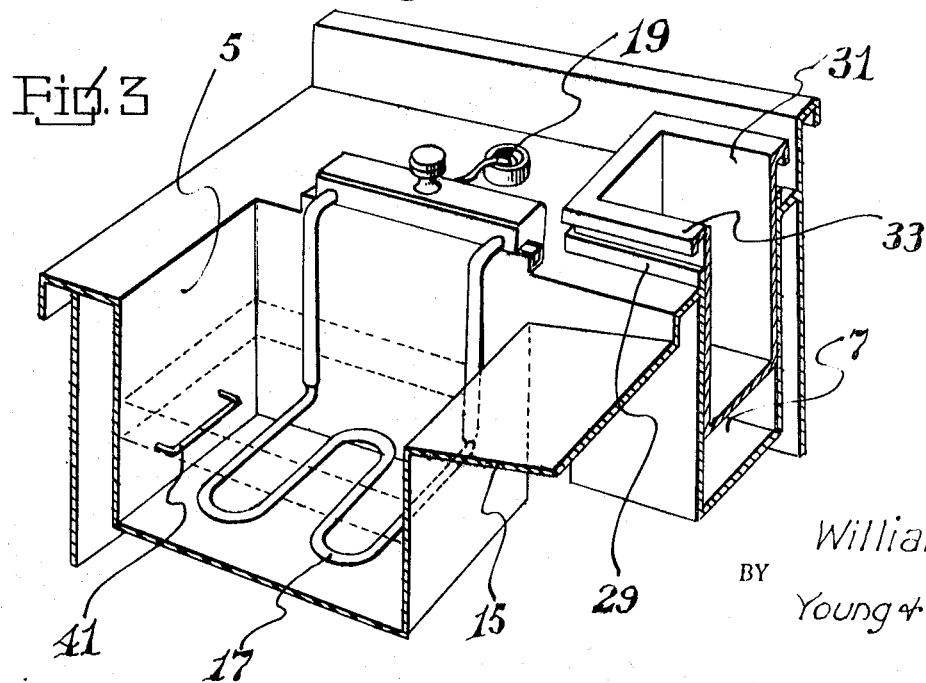
INVENTOR.
William T. Day
BY
Young & Thompson
ATTORNEYS

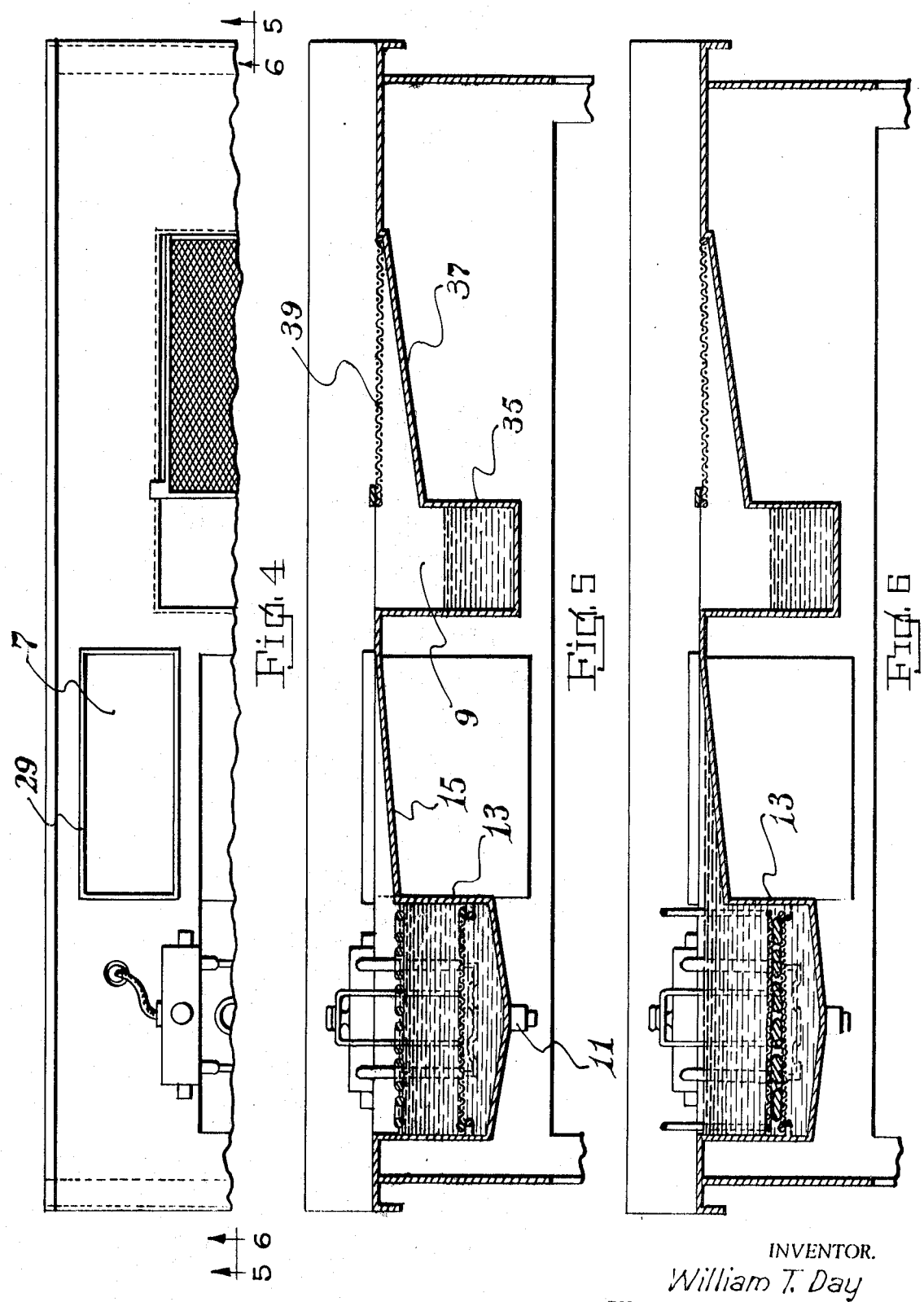

FOOD FRYER

The present invention relates to food frying apparatus, more particularly of the type in which food is immersed in or floats on the surface of hot cooking oil. The present invention is of particular interest in commercial food preparation establishments such as restaurants, cafeterias, carry-out shops, bakeries, etc.

It is an object of the present invention to provide food frying apparatus, in which the danger of spilling cooking fat will be reduced to a minimum.

Another object of the present invention is the provision of food frying apparatus of the type including a reservoir for cooking oil, in which uncontrolled overflow from the reservoir is prevented.

Finally, it is an object of the present invention to provide food frying apparatus which will be relatively simple and inexpensive to manufacture, easy to operate, clean, maintain and repair, and rugged and durable in use.

Other objects and advantages of the present invention will become apparent from a consideration of the following description, taken in connection with the accompanying drawings, in which:

FIG. 1 is a perspective view of food frying apparatus according to the present invention;

FIG. 2 is a perspective view of food retaining racks for use in the present invention;

FIG. 3 is an enlarged fragmentary perspective view of a portion of the apparatus of FIG. 1;

FIG. 4 is a fragmentary plan view of a rear portion of the apparatus;

FIG. 5 is a side cross sectional view of the apparatus on the line 5—5 of FIG. 4, and showing the frying of a floating food such as donuts; and FIG. 6 is a view similar to FIG. 5, taken on the line 6—6 of FIG. 4, and showing the frying of a submerged food such as chicken or seafood, etc.

Referring now to the drawings in greater detail, there is shown food frying apparatus according to the present invention, in the form of a worktable 1 having a horizontal uniplanar table top 3 in which are recessed three receptacles 5, 7 and 9.

Receptacle 5 is a cooking vessel for holding hot cooking oil and has vertical sidewalls that terminate at the level of top 3 and a drain 11 centrally of its bottom wall which tapers to this drain. Receptacle 5 is distinctively characterized by the provision of a sidewall 13 which does not rise full height of receptacle 5 but instead terminates upwardly in an inclined overflow and drain wall 15.

A heating element 17 is disposed in the bottom of receptacle 5 for heating the cooking oil therein and is of the electric resistance type which detachably plugs into an electric receptacle 19 in top 3 of table 1, the receptacle having an annular upstanding wall thereabout to exclude cooking oil that might spill on top 3.

Foraminous racks 21 and 23 have handles 25 and 27 thereon that upstand from the horizontal openwork or wire bottoms of the racks. The handles 25 are disposed at opposite longitudinal sides of the rack 21 and the handles 27 are disposed at opposite ends of the rack 23. The distance between the handles 25 is at least as great as the width of rack 23 and the distance between the handles 27 is at least as great as the length of the rack 21, so that racks 21 and 23 can nest within each other in either the FIG. 2 position or the reverse of the FIG. 2 position, without interference between the handles of one rack and the horizontal bottom tray of the other rack. The length but not the width of racks 21 and 23 is greater than the width, from front to rear, of drain wall 15, thereby to permit racks 21 and 23 to rest by gravity on their ends on top 3 above wall 15.

Receptacle 7 is spaced from and somewhat to the rear of receptacle 5 and has an upstanding margin 29 thereabout. A removable drain receptacle 31 slides vertically in receptacle 7 and has outwardly and downwardly extending marginal flanges 33 that fit over and about margin 29 to provide a closure against the escape of cooking oil downwardly between receptacles 7 and 31.

Receptacle 9 can have generally the same shape as receptacle 5, particularly as regards its relatively short side wall 35 that terminates upwardly in an inclined drain wall 37. Wall 37, in turn, is covered by a removable draining rack 39 that rests on the three marginal edges of top 3 that overlie inclined wall 37. Receptacle 9 is intended for the reception and retention of a supply of a liquid for further treating the foods fried in receptacle 5, such as glaze for donuts.

In operation, a quantity of cooking oil is introduced into receptacle 5 and heating element 17 is actuated until the oil attains the desired temperature. Food to be fried (in a first example, donuts) is placed on rack 21 by the operator, who then grasps rack 21 by the handles 25 and lowers rack 21 into receptacle 5 until rack 21 rests on supports 41 that support it above the heating element 17 in the bottom of receptacle 5. The donuts float free of rack 21 and the parts have the position shown in FIG. 5.

After the donuts have been turned over to fry on the other side, rack 21 is again raised by the operator by handles 25 until the fried donuts are lifted out of receptacle 5; and rack 21 is then laid on inclined wall 15 or on the margins of top 3 on opposite sides of inclined wall 15, until excess cooking oil has drained from the donuts and from rack 21. This excess cooking oil of course flows by gravity back into receptacle 5.

The donuts are next dumped from rack 21 onto draining rack 39 and glaze from receptacle 9 can be dipped up with a utensil and poured over the donuts to glaze them. The excess glaze runs down inclined wall 37 and back to receptacle 9. The donuts can then be removed from the rack 39 on which they were glazed, and placed on trays or packaged or otherwise further handled.

Once the donuts have been dumped from rack 21, this rack is then placed over the drain receptacle 31 so that any further cooking oil will drain from the rack. From time to time, receptacle 31 can be lifted out and emptied into receptacle 5.

To deep fry food such as chicken, fish, shrimps, etc., the breaded food is placed on one of the racks 21 and 23 and the other rack 21 or 23 is placed on top of the food. The assembly of racks with the food between them is then lowered into receptacle 5 to the position shown in FIG. 6. The parts retain this relationship until the food is deep fried, whereupon the assembly of racks is removed and drained above or on inclined wall 15, after which the upper rack is removed and placed over drain receptacle 31 while the food is dumped from the lower rack onto draining rack 39, after which the lower rack 21 or 23 is also placed over drain receptacle 31. Apart from handling two racks, therefore, the manipulative steps in FIG. 6 are the same as in FIG. 5.

A very important feature of the invention is also illustrated in FIG. 6. When food is submerged, as in FIG. 6, the level of the cooking oil rises higher than when the food is merely floated on the cooking oil as in FIG. 5. The rise in liquid level is accommodated, without overflow, by passage of some of the cooking oil laterally above the inclined wall 15, so that the space between inclined wall 15 and the plane of table top 3 provides in effect an overflow storage chamber that helps prevent unintended flow of oil onto the top 3.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Food frying apparatus comprising a table having a flat horizontal tabletop and a receptacle for cooking oil recessed in the tabletop, said receptacle having one wall that terminates upwardly short of the tabletop and that continues in an upwardly inclined draining wall that extends away from the receptacle toward the plane of the tabletop, said tabletop having flat horizontal portions that surround the receptacle and inclined draining wall on all sides, heating means in the bottom of said receptacle to heat cooking oil in the receptacle, and a pair of frying racks that have foraminous bottoms and upstanding handles, said racks being nestable within each other to retain food between said racks for deep frying said food in cooking oil, said receptacle having means to support said racks in said receptacle above said heating means, said handles extending up above the level of said tabletop when said racks are supported on said supporting means, said racks having one horizontal dimension greater than the width of said inclined wall thereby to support said frying racks by their ends on said flat horizontal tabletop on opposite sides of said inclined wall.

2. Apparatus as claimed in claim 1, said racks being rectangular and each having two relatively short sides and two relatively long sides, one of said racks having said handles upstanding from said relatively short sides, the other of said racks having said handles upstanding from said relatively long sides, the handles of one of said racks being spaced apart a distance to receive between them the other said rack when said racks are nested.

3. Apparatus as claimed in claim 2, said racks being flat foraminous grids and said handles being vertical inverted U-shaped members having legs secured at their lower ends to the margins of the racks.

* * * * *